United States Patent
Takamura et al.

(10) Patent No.: US 10,042,943 B2
(45) Date of Patent: *Aug. 7, 2018

(54) INFORMATION PROCESSING APPARATUS, INFORMATION PROCESSING METHOD AND PROGRAM

(71) Applicant: SONY CORPORATION, Tokyo (JP)

(72) Inventors: Seiichi Takamura, Saitama (JP); Kei Tateno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,182

(22) Filed: Oct. 27, 2016

(65) Prior Publication Data

US 2017/0046443 A1 Feb. 16, 2017

Related U.S. Application Data

(63) Continuation of application No. 14/812,027, filed on Jul. 29, 2015, now Pat. No. 9,507,840, which is a continuation of application No. 13/862,804, filed on Apr. 15, 2013, now Pat. No. 9,135,368.

(30) Foreign Application Priority Data

Jun. 13, 2012 (JP) .................. 2012-133785

(51) Int. Cl.
*G06F 17/30* (2006.01)
*G06Q 50/00* (2012.01)

(52) U.S. Cl.
CPC .... *G06F 17/30867* (2013.01); *G06F 17/3087* (2013.01); *G06F 17/30241* (2013.01); *G06F 17/30528* (2013.01); *G06F 17/30572* (2013.01); *G06F 17/30943* (2013.01); *G06F 17/30991* (2013.01); *G06Q 50/01* (2013.01)

(58) Field of Classification Search
CPC ............... G06F 17/30; G06F 17/30867; G06F 17/30241; G06F 17/30528
USPC .................................................. 707/600–899
See application file for complete search history.

(56) References Cited

U.S. PATENT DOCUMENTS

2010/0250672 A1  9/2010  Vance et al.
2011/0179029 A1*  7/2011  Kim ....................... G06Q 10/10
                                                   707/737

FOREIGN PATENT DOCUMENTS

| JP | 2000-167233 | 6/2000 |
| JP | 2000-222466 | 11/2000 |
| JP | 2003-087845 | 3/2003 |

(Continued)

OTHER PUBLICATIONS

Jan. 20, 2017, CN communication issued for related CN application No. 201310222794.1.

(Continued)

*Primary Examiner* — Isaac M Woo
(74) *Attorney, Agent, or Firm* — Paratus Law Group, PLLC

(57) ABSTRACT

There is provided an information processing apparatus including an experience extracting unit extracting experience information including information related to a time or a place from text information input by a user, and a user extracting unit extracting a user group in which the experience information of one or more users extracted by the experience extracting unit is compared to find a commonality in the experience information.

39 Claims, 16 Drawing Sheets

(56) References Cited

FOREIGN PATENT DOCUMENTS

| JP | 2007-108806 | 4/2007 |
|----|-------------|--------|
| JP | 2008-003655 | 1/2008 |
| JP | 2008-165761 | 7/2008 |
| JP | 2010-267105 | 11/2010 |
| WO | WO2010/111537 A2 | 9/2010 |

OTHER PUBLICATIONS

Sep. 6, 2016, JP communications issued for related JP application No. 2012-133785.

Ryo Makishima, et al., A Real-time Local Area Information Sharing System, Multimedia, Distributed, Cooperative, and Mobile Symposium, vol. 2010, No. 1, Jun. 30, 2010, pp. 1175-1182.

Nov. 4, 2015, JP communication issued for related JP application No. 2012-133785.

* cited by examiner

FIG. 6

EXAMPLE OF EXPERIENCE PLACE EXTRACTION

|  | [*, 0] | [*, 1] |  |
|---|---|---|---|
|  | MORPHEME | WORD CLASS | LABEL |
|  | BAITO | NOUN: GENERAL | ○ |
|  | MENSETSU | NOUN: CONJUNCTION OF CONJUGATION OF S-STEM VERBS | ○ |
|  | OWAT | VERB: INDEPENDENT | ○ |
| [-2, *] | TE | PARTICLE: CONJUNCTIVE PARTICLE | ○ |
| [-1, *] | KYOTO | NOUN: PROPER NOUN | B - Where |
| [0, *] | EKI | NOUN: SUFFIX | I - Where |
| [1, *] | DE | PARTICLE: CASE-MARKING PARTICLE | ○ |
| [2, *] | KURASHIKKU | NOUN: GENERAL | ○ |
|  | KII | VERB: INDEPENDENT | ○ |
|  | TERU | VERB: NON-INDEPENDENT | ○ |
|  | RUPAN | NOUN: GENERAL | ○ |
|  | ♪ | NOUN: CONJUNCTION OF CONJUGATION OF S-STEM VERBS | ○ |

FIG. 7

| id | EXPERIENCE PLACE | TEXT INFORMATION |
|---|---|---|
| 1 | LIVE | I WANT TO GO TO LIVE SOON |
| 2 | KARAOKE | MORE EMI-CHAN'S SONGS SHOULD BE IN KARAOKE |
| 3 | LIVE | WHICH SONG DO I SING IN LIVE ON SUNDAY? |
| 4 | RAIN | OH, IT STARTED RAINING. |
| 5 | TRAIN | I AM IN TRAIN NOW. |
| 6 | RADIO | I WAS LISTENING TO RADIO AND SUDDENLY LAUGHING. |
| 7 | LIVE | I GOT LIVE TICKET. |
| 8 | HOME | I GO HOME NOW, SEE YOU. |
| 9 | TELEVISION | SHOW ON TELEVISION IS SO FUNNY. |
| 10 | BEFORE GOING TO BED | I READ BOOK BEFORE GOING TO BED AND WEPT BITTERLY. |
| 11 | CONCERT | CAN YOU GO TO CONCERT? |
| 12 | ROOM | I HAVE STAYED IN ROOM IN CONSECUTIVE HOLIDAYS. |
| 13 | SHOP | I AM CAUGHT UP IN BGM SINCE I HAVE HEARD BGM IN SHOP. |

FIG. 8

| id | POSTING TIME AND DATE | USER | EXPERIENCE TYPE | EXPERIENCE TARGET | EXPERIENCE TIME | EXPERIENCE PLACE | TEXT INFORMATION |
|---|---|---|---|---|---|---|---|
| 1 | 2012-03-17 22:05:30 | USER A | SING SONG | SONG A | FUTURE | A STATION | I WANT TO SING SONG A IN CHORUS IN KARAOKE IN A STATION |
| 2 | 2012-03-17 22:55:30 | USER B | SING SONG | SONG A | FUTURE | B STATION | I AM IN B STATION NOW AND WANT TO SING SONG A IN CHORUS IN KARAOKE |
| 3 | 2012-03-17 22:05:30 | USER C | BATTLE IN GAME | GAME B | PRESENT | C STATION | I AM IN C STATION NOW AND WANT TO PLAY GAME B AGAINST SOMEONE |
| 4 | 2012-03-16 09:11:03 | USER D | BATTLE IN GAME | GAME B | FUTURE | C STATION | I WANT TO PLAY GAME B AGAINST SOMEONE IN C STATION |
| 5 | 2012-03-17 13:05:30 | USER E | JOGGING | NOTHING | PRESENT | PLACE D | I AM IN PLACE D NOW. SO CONGESTED. |
| 6 | 2012-03-17 08:11:30 | USER F | JOGGING | NOTHING | PAST | PLACE D | I RUN 5 KM IN PLACE D. NOT CONGESTED. |
| 7 | 2012-03-18 22:05:30 | USER G | PLAY MUSIC | JAZZ | FUTURE | A STATION | I AM GOING TO PLAY JAZZ MUSIC IN A STATION. |
| 8 | 2012-03-18 22:55:30 | USER H | LISTEN TO MUSIC | JAZZ | FUTURE | A STATION | I WANT TO LISTEN TO JAZZ MUSIC IN A STATION |

INFORMATION PROCESSING APPARATUS, INFORMATION PROCESSING METHOD AND PROGRAM

CROSS-REFERENCE TO PRIOR APPLICATION

This application is a continuation of U.S. patent application Ser. No. 14/812,027 (filed on Jul. 29, 2015), which is a continuation of U.S. patent application Ser. No. 13/862,804 (filed on Apr. 15, 2013 and issued as U.S. Pat. No. 9,135,368 on Sep. 15, 2015), which claims priority to Japanese Patent Application No. 2012-133785 (filed on Jun. 13, 2012), which are all hereby incorporated by reference in their entirety.

BACKGROUND

The present disclosure relates to an information processing apparatus, an information processing method and a program.

Recently, with the development of a network environment, SNS (Social Networking Service) and websites in the form of a diary (so-called blog) become common. In this way, text information indicating various kinds of experiences of many users are posted on the Internet. From such text information, it is possible to know the past experience, ongoing experience or planned experience of each user. Also, as disclosed in Japanese Patent Laid-open No. 2008-003655, it is possible to detect a user's action pattern based on information acquired from a sensor.

SUMMARY

However, although there is potentially a group of users who want to share an experience with other users, there are many cases where an opportunity is missed by the mismatch of time and place, that is, it is not possible to realize sharing of the experience.

Therefore, the present disclosure suggests a newly-improved information processing apparatus, information processing method and program that can support sharing an experience by a user group.

According to an embodiment of the present disclosure, there is provided an information processing apparatus including an experience extracting unit extracting experience information including information related to a time or a place from text information input by a user, and a user extracting unit extracting a user group in which the experience information of one or more users extracted by the experience extracting unit is compared to find a commonality in the experience information.

According to an embodiment of the present disclosure, there is provided an information processing method including extracting experience information including information related to a time or a place from text information input by a user, and extracting a user group in which the experience information of one or more users is compared to find a commonality in the experience information.

According to an embodiment of the present disclosure, there is provided a program for causing a computer to function as an information processing apparatus, the information processing apparatus including an experience extracting unit extracting experience information including information related to a time or a place from text information input by a user, and a user extracting unit extracting a user group in which the experience information of one or more users extracted by the experience extracting unit is compared to find a commonality in the experience information.

According to the embodiments of the present disclosure described above, it is possible to support sharing an experience by a user group.

BRIEF DESCRIPTION OF THE DRAWINGS

FIG. 6 is an explanatory diagram illustrating a specific example of experience place extraction;

FIG. 7 is an explanatory diagram illustrating a specific example of experience scene extraction;

FIG. 8 is an explanatory diagram illustrating a specific example of an experience information database;

DETAILED DESCRIPTION OF THE EMBODIMENT(S)

Figure 1:
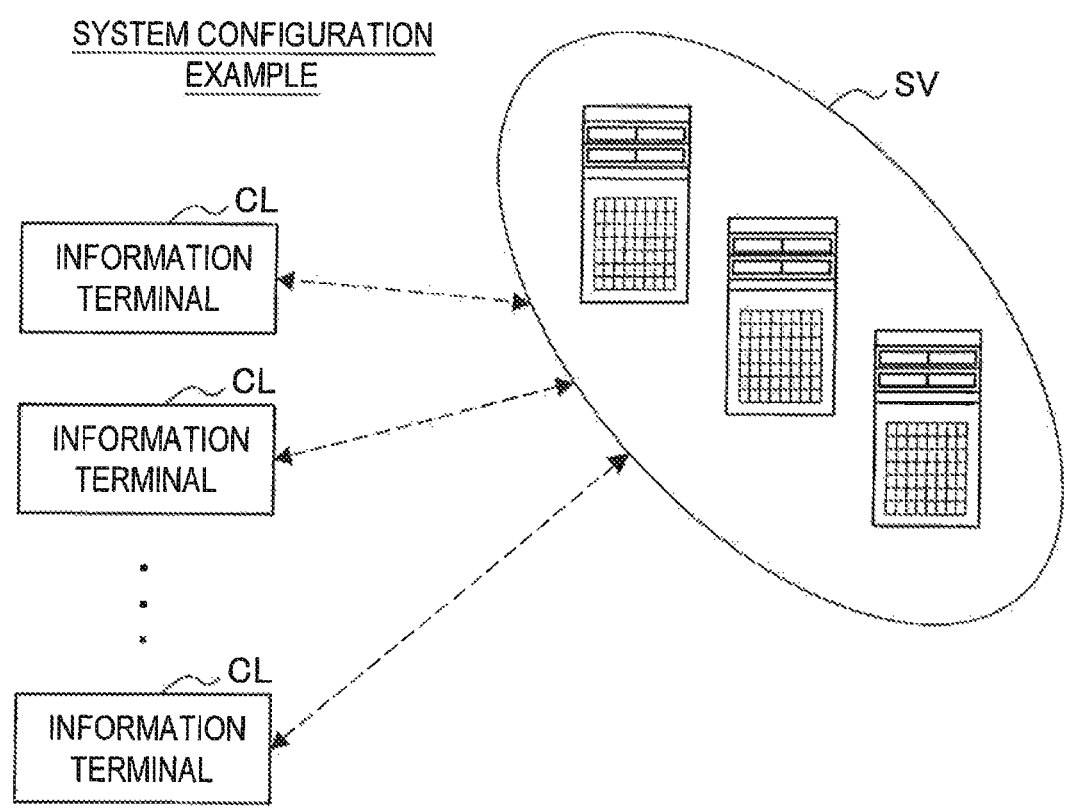
FIG. 1 is an explanatory diagram illustrating a configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in the specification and the drawings, there is a case where multiple structural elements having substantially the same functional configuration are distinguished from each other by attaching different alphabets to the ends of the same reference numerals. However, in a case where it is not especially requested to distinguish the multiple structural elements having substantially the same functional configuration from each other, only the same reference numerals are assigned.

Also, the present disclosure is explained according to the following item order.

1. Basic configuration of information processing system
2. Configuration of server apparatus
3. Operations of server apparatus 4. Specific example of operations
(First Embodiment)
(Second Embodiment)
(Third Embodiment)
(Fourth Embodiment)
(Fifth Embodiment
(Supplement)
5. Hardware configuration
6. Conclusion

1. BASIC CONFIGURATION OF INFORMATION PROCESSING SYSTEM

A technique according to the embodiment of the present disclosure can be implemented in various ways as specifically described below as an example. Also, a server apparatus (SV) according to each embodiment forming an information processing system includes: A. an experience extracting unit (132) extracting experience information including information related to time or place, from text information input by a user, and B. a user extracting unit (135) extracting a user group in which a commonality is found in the experience information, by comparison of the experience information of one or two users extracted by the experience extracting unit.

In the following, first, with reference to FIG. 1, an explanation is given to a basic configuration of an information processing system including a server apparatus according to the present embodiment which is an example of an information processing apparatus.

FIG. 1 is an explanatory diagram illustrating a configuration of an information processing system according to an embodiment of the present disclosure. As illustrated in FIG. 1, an information processing system according to an embodiment of the present disclosure mainly includes multiple information terminals CL's and a server apparatus SV. Also, the system configuration introduced herein is just an example and it is possible to apply a technique according to the present embodiment to various system configurations available now and in the future.

The information terminal CL is an example of a device used by a user. As the information terminal CL, for example, a mobile phone, a smart phone, a digital still camera, a digital video camera, a personal computer, a table terminal, a car navigation system, a portable game device, health appliances (including a pedometer (registered trademark)) and medical equipment are assumed. Meanwhile, as the server apparatus SV, for example, a home server and a cloud computing system are assumed.

Naturally, a system configuration to which a technique according to the present embodiment is applicable is not limited to the example in FIG. 1, but, for convenience of explanation, an explanation is given with an assumption of the multiple information terminals CL and the server apparatus SV which are connected by wired and/or wireless networks. Therefore, a configuration is assumed in which it is possible to exchange information between the information terminals CL and the server apparatus SV. However, it is possible to employ a configuration such that, among various functions held by the information provision systems functions to be held by the information terminals CL and functions to be held by the server apparatus SV are freely designed. For example, it is desirable to design it taking into account the computing power and communication speed of the information terminals CL.

2. CONFIGURATION OF SERVER APPARATUS

A rough configuration of an information processing system according to the present embodiment has been explained above. Subsequently, with reference to FIG. 2 to FIG. 8, a configuration of the server apparatus SV is explained.

Figure 2:
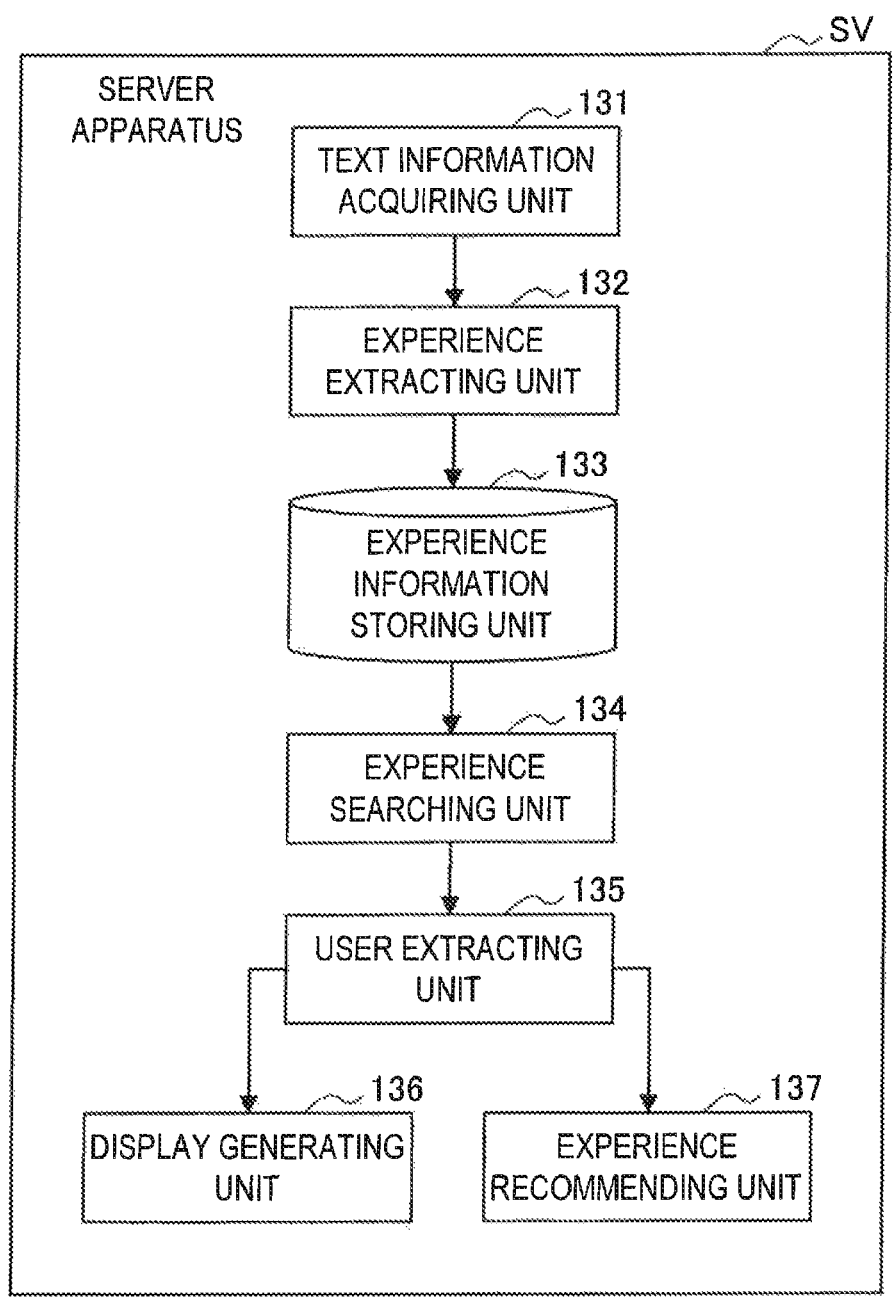
FIG. 2 is a functional block diagram illustrating a configuration of a server apparatus SV.

FIG. 2 is a functional block diagram illustrating the configuration of the server apparatus SV. As illustrated in FIG. 2, the server apparatus SV includes a text information acquiring unit 131, an experience extracting unit 132, an experience information storing unit 133, an experience searching unit 134, a user extracting unit 135, a display generating unit 136 and an experience recommending unit 137.

(Text Information Acquiring Unit)

The text information acquiring unit 131 acquires text information input by a user. For example, the text information acquiring unit 131 may denote an input device to input a text by the user or denote an information collection device to acquire text information from social network services or applications. Here, for convenience of explanation, an explanation is given with an assumption that the text information acquiring unit 131 denotes an input unit such as a software keyboard.

(Experience Extracting Unit)

The text information acquired by the text information acquiring unit 131 is input in the experience extracting unit 132. At this time, the experience extracting unit 132 may receive an input of the text information together with time information at the time of the input of the text information. When the text information is input, the experience extracting unit 132 analyzes the input text information and extracts information related to user's experiences from the text information. For example, the experience information denotes information including an experienced event (such as an experience type), a place of the experience and the time of the experience.

Figure 3:
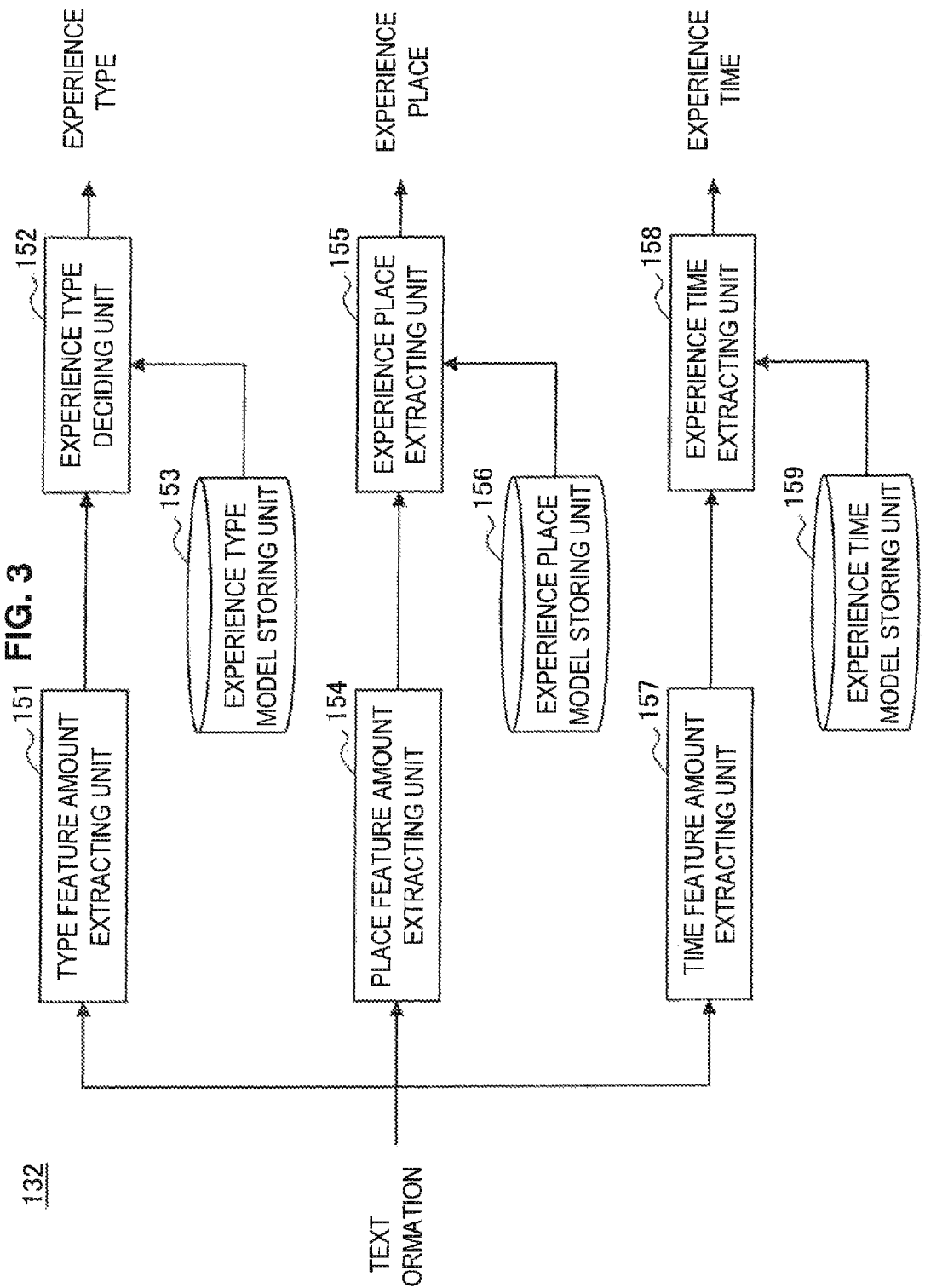
FIG. 3 is an explanatory diagram illustrating a detailed configuration of an experience extracting unit.

Here, a functional configuration of the experience extracting unit 132 is explained in detail with reference to FIG. 3. As illustrated in FIG. 3, the experience extracting unit 132 mainly includes a type feature amount extracting unit 151, an experience type deciding unit 152 and an experience type model storage unit 153. Further, the experience extracting unit 132 includes a place feature amount extracting unit 154, an experience place extracting unit 155 and an experience place model storage unit 156. Further, the experience extracting unit 132 includes a time feature amount extracting unit 157, an experience time extracting unit 158 and an experience time model storage unit 159.

When the text information is input in the experience extracting unit 132, the text information is input in the type feature amount extracting unit 151, the place feature amount extracting unit 154 and the time feature amount extracting unit 157.

The type feature amount extracting unit 151 extracts a feature amount related to an experience type (hereinafter referred to as "type feature amount") from the input text information. The type feature amount extracted by the type feature amount extracting unit 151 is input in the experience type deciding unit 152. The experience type deciding unit 152 decides an experience type from the input type feature amount, using a learning model stored in the experience type model storage unit 153.

Also, the place feature amount extracting unit 154 extracts a feature amount related to a place of the experience (hereinafter referred to as "place feature amount") from the input text information. The place feature amount extracted by the place feature amount extracting unit 154 is input in the experience place extracting unit 155. The experience place extracting unit 155 decides a place of the experience from the input place feature amount, using a learning model stored in the experience place model storage unit 156.

Also, the time feature amount extracting unit 157 extracts a feature amount related to the time of the experience (hereinafter referred to as "time feature amount") from the input text information. The time feature amount extracted by the time feature amount extracting unit 157 is input in the experience time extracting unit 158. The experience time extracting unit 158 decides the time of the experience from the input time feature amount, using a learning model stored in the experience time model storage unit 159.

Figure 4:
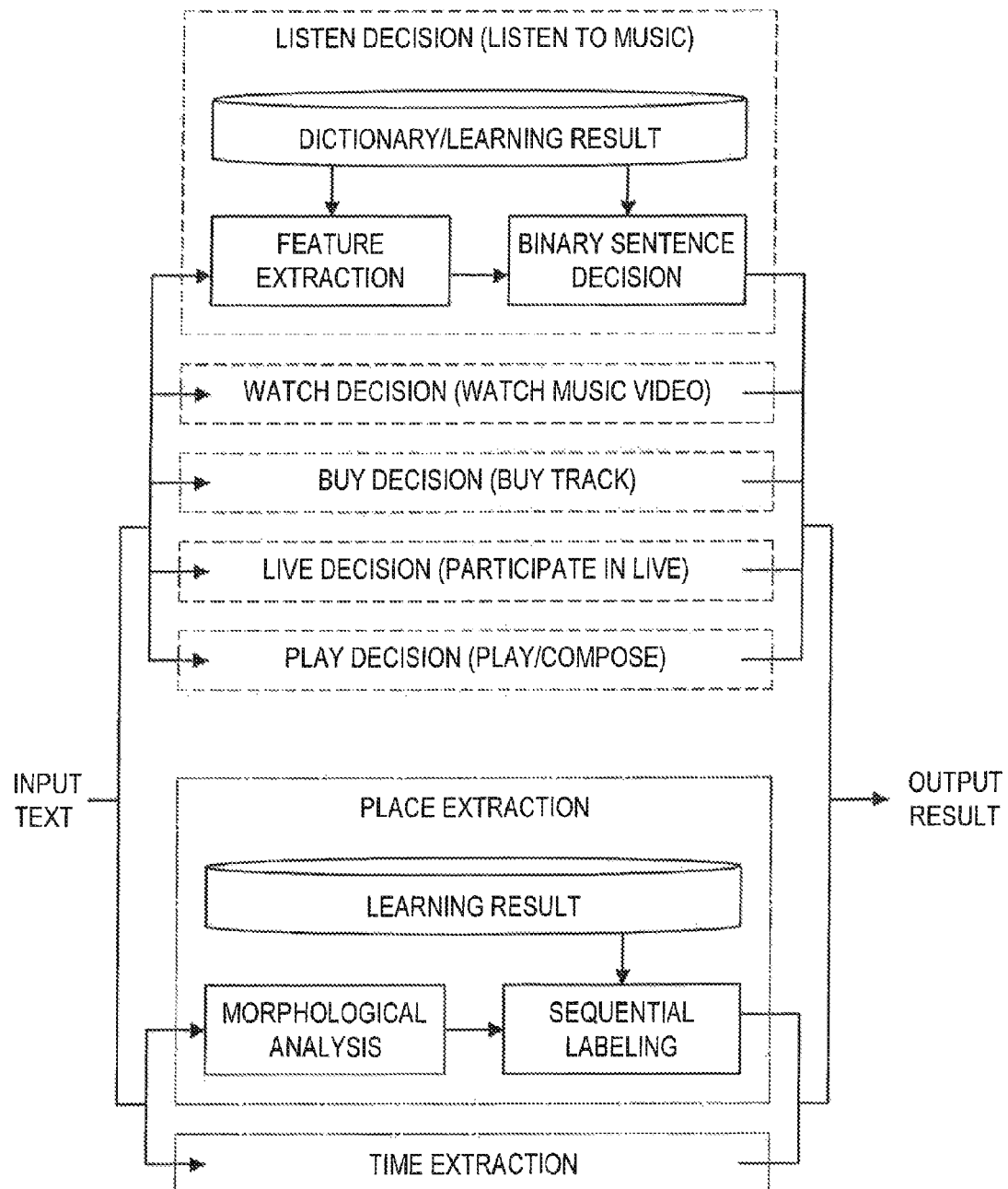
FIG. 4 is an explanatory diagram for explaining content of specific processing performed by an experience extracting unit.

Here, with reference to FIG. 4, content of processing performed by the experience extracting unit 132 is supplementarily explained using a music experience as an example. FIG. 4 is an explanatory diagram for explaining content of specific processing performed by the experience extracting unit 132. Also, for convenience of explanation, although an explanation is given using a music experience as an example, the technical scope of the present embodiment is not limited to this.

As illustrated in FIG. 4, in the case of a music experience, possible examples of the experience type include "listen to music (listen)," "watch a music video on TV/movie/DVD (watch)," "buy a track/CD (buy)," "participate in a live or concert (live)" and "sing/play/compose a song (play)." The experience extracting unit 132 decides these experience types using the functions of the type feature amount extracting unit 151 and the experience type deciding unit 152.

For example, in the case of deciding an experience type of "listen," first, the type feature amount extracting unit 151 extracts a type feature amount related to the experience type of "listen" by a method of morpheme, n-gram or maximum substring. Next, the experience type deciding unit 152 decides, from the type feature amount, whether it corresponds to the experience type of "listen," by a method such as SVM and logical regression. The decision result in the experience type deciding unit 152 is output as information indicating the experience type. Similarly, decision results with respect to experience types of "watch," "buy," "live" and "play" are acquired.

Figure 5:
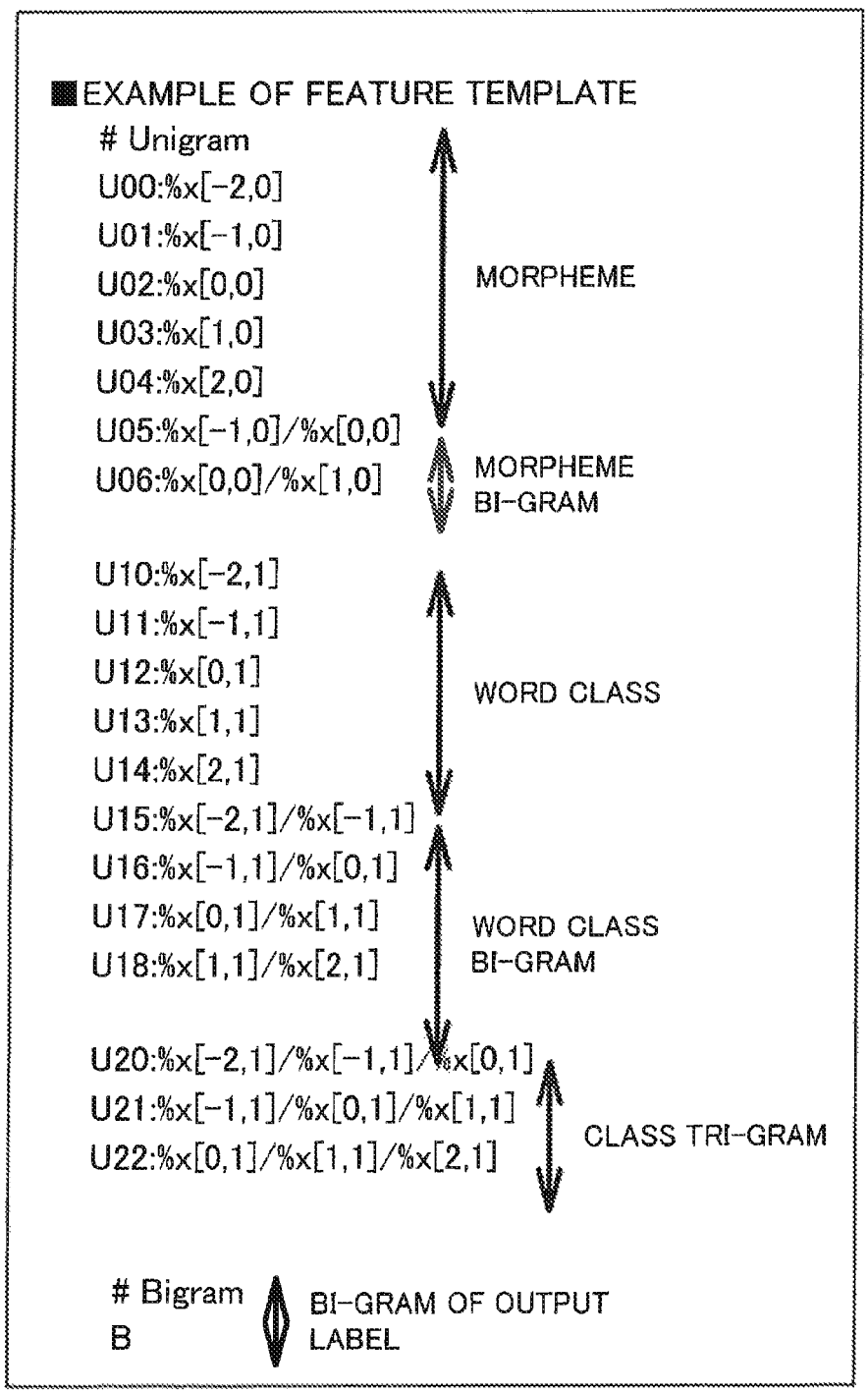
FIG. 5 is an explanatory diagram illustrating a configuration of a feature template.

Also, experience place extraction is realized by the functions of the place feature amount extracting unit 154 and the experience place extracting unit 155. First, the place feature amount extracting unit 154 performs a morphological analysis for input text information and inputs the result in the experience place extracting unit 155. Next, based on the morphological analysis result, the experience place extracting unit 155 extracts an experience place using a method such as CRF (Conditional Random Field). For example, the experience place extracting unit 155 extracts an experience place (in the example in FIG. 6, extracts "Kyoto station") as illustrated in FIG. 6, using a feature template as illustrated in FIG. 5.

Also, experience time extraction is realized by the functions of the time feature amount extracting unit 157 and the experience time extracting unit 158. Similar to the above experience place extraction, the experience time extraction is realized by a sequential labeling method using morphological analysis, CRF and so on. Also, as expression of the experience time, for example, it is possible to use expression of various units such as "present," "past," "future," "morning," "evening" and "night." Here, there is a case where part or all of the experience type, the experience place and the experience type are not necessarily acquired.

Supplement

Also, although an example has been described above where the experience extracting unit 132 extracts a geographical place like "A station" as an experience place, experience information extracted by the experience extracting unit 132 is not limited to the example. For example, the experience extracting unit 132 may extract information related to a non-geographical experience scene such as a "train" and "concert".

FIG. 7 is an explanatory diagram illustrating a specific example of experience scene extraction. For example, in the case of analyzing text information associated with id "1," the experience extracting unit 132 may extract "live" included in the text information as an experience scene. In the following explanation, although information processing using other experience information than an experience place is explained, it is possible to realize similar information processing even by using information related to an experience place.

(Experience Information Storing Unit)

The experience information storing unit 133 stores an experience information database including experience information (such as an experience type, experience place and experience time) extracted by the experience extracting unit 132. Here, with reference to FIG. 8, a specific example of the experience information database is explained.

FIG. 8 is an explanatory diagram illustrating a specific example of the experience information database. In the example illustrated in FIG. 8, the experience information database includes an id to identify each experience information, posting time and date of text information, user, experience type, experience target, experience time, experience place and text information. For example, id "1" is associated with text information "I want to sing song A in chorus in karaoke in A station," and experience type "sing song," experience target "song A," experience time "future" and experience place "A station" extracted as experience information by analyzing the text information.

(Experience Searching Unit)

The experience searching unit 134 searches experience information from the experience information database stored in the experience information storing unit 133. For example, when at least one condition of the experience user, the experience type, the experience target, the experience place and the experience time is designated, the experience searching unit 134 searches experience information corresponding to the designated condition.

(User Extracting Unit)

Based on the search result in the experience searching unit 134, the user extracting unit 135 extracts a user group corresponding to multiple entries in which at least one of the experience type, the experience target, the experience place and the experience time is common. For example, the user extracting unit 135 extracts user A and user B corresponding to id "1" and id "2" in which the experience type, the experience target and the experience time are common in the experience information database illustrated in FIG. 8.

(Display Generating Unit)

The display generating unit 136 generates a display indicating a relationship between experience information of the user group extracted by the user extracting unit. A specific example of display generated by the display generating unit 136 is explained in detail in "4. Specific example of operations."

(Experience Recommending Unit)

The experience recommending unit 137 recommends the time or place for experience sharing to the user group extracted by the user extracting unit. With such a configuration, the user group visits a specific place at recommended time or the user group visits a recommended place at specific time, so that the user group can share an experience. Also, the experience recommending unit 137 may perform recommendation according to the familiarity of users included in the user group. For example, in a case where the familiarity of the users is high, it is relatively easy for the users to adjust the time and place with other users who request the same experience, but, in a case where the familiarity of the users is low, it is considered that the adjustment is difficult. Therefore, the experience recommending unit 137 may perform the recommendation in a case where the familiarity of the users is low.

3. OPERATIONS OF SERVER APPARATUS

The configuration of the server apparatus SV according to the present embodiment has been explained above. Subsequently, with reference to FIG. 9, operations of the server apparatus SV according to the present embodiment are adjusted.

Figure 9:
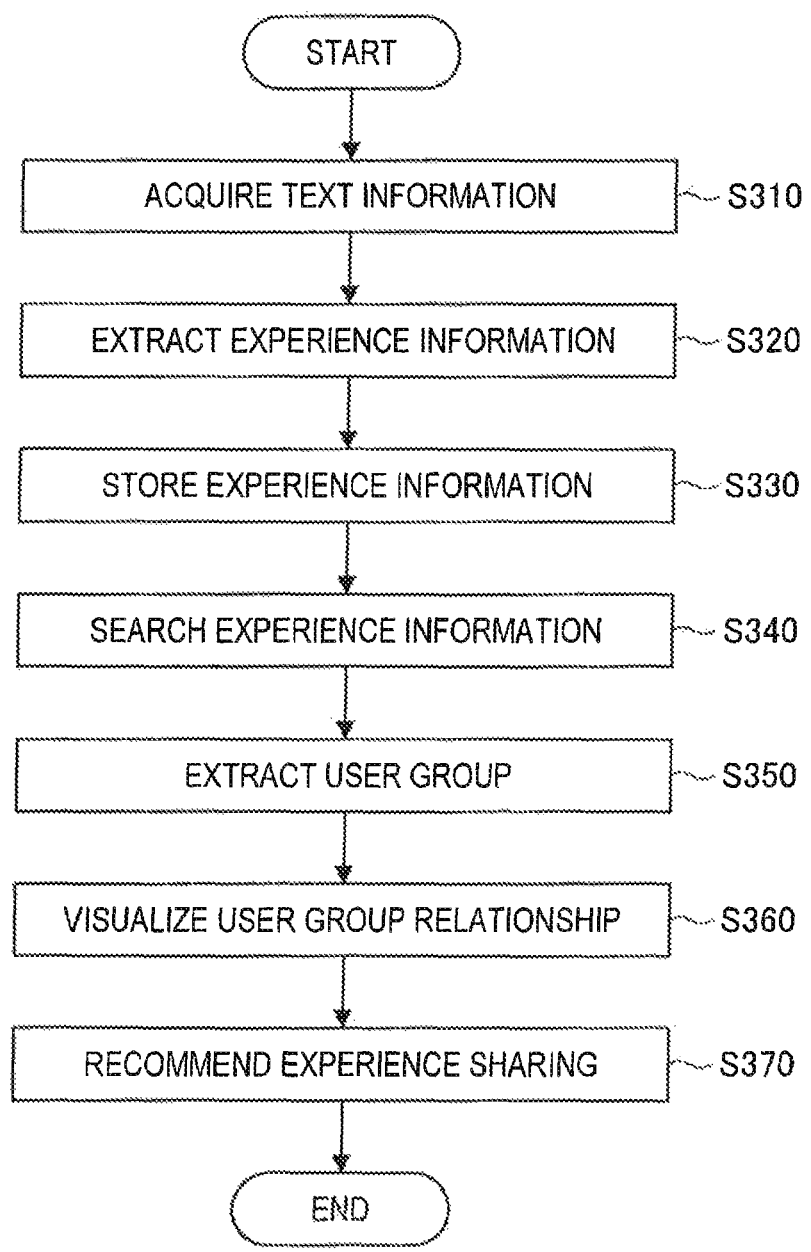
FIG. 9 is a flowchart illustrating operations of a server apparatus SV according to the present embodiment.

FIG. 9 is a flowchart illustrating operations of the server apparatus SV according to the present embodiment. As illustrated in FIG. 9, first, when the text information acquiring unit 131 acquires text information (S310), the experience extracting unit 132 analyzes the text information and extracts experience information related to a user experience from the text information (S320). Subsequently, the experience information storing unit 133 stores an experience information database including the experience information extracted by the experience extracting unit 132 (S330).

After that, when the experience searching unit 134 searches experience information from the experience information database (S340), based on the search result in the experience searching unit 134, the user extracting unit 135 extracts a user group corresponding to multiple entries in which at least one of an experience type, experience target, experience place and experience time is common (S350).

Subsequently, the display generating unit 136 generates a display indicating a relationship of experience information of the user group extracted by the user extracting unit, that is, visualizes a relationship of the user group (such as the similarity of experience information) (S360). Also, the experience recommending unit 137 recommends the time or place for experience sharing to the user group extracted by the user extracting unit (S370). Also, the display generated by the display generating unit 136 and the recommendation content in the experience recommending unit 137 may be transmitted to the information terminal CL of each user included in the user group.

4. SPECIFIC EXAMPLE OF OPERATIONS

The operations of the server apparatus SV according to the present embodiment have been adjusted with reference to FIG. 9. Subsequently, with reference to FIG. 10 to FIG. 15, a specific example of the operations of the server apparatus SV according to the present embodiment is explained. Also, in the following, an explanation is given with an assumption that the experience information storing unit 133 stores the experience information database illustrated in FIG. 8.

First Embodiment

In the experience information database, id "1" is associated with experience information of user A who wants to sing song A, and id "2" is associated with experience information of user B who wants to sing same song A. Therefore, the user group extracting unit 135 extracts users A and B having the common experience type, as a user group.

Figure 10:
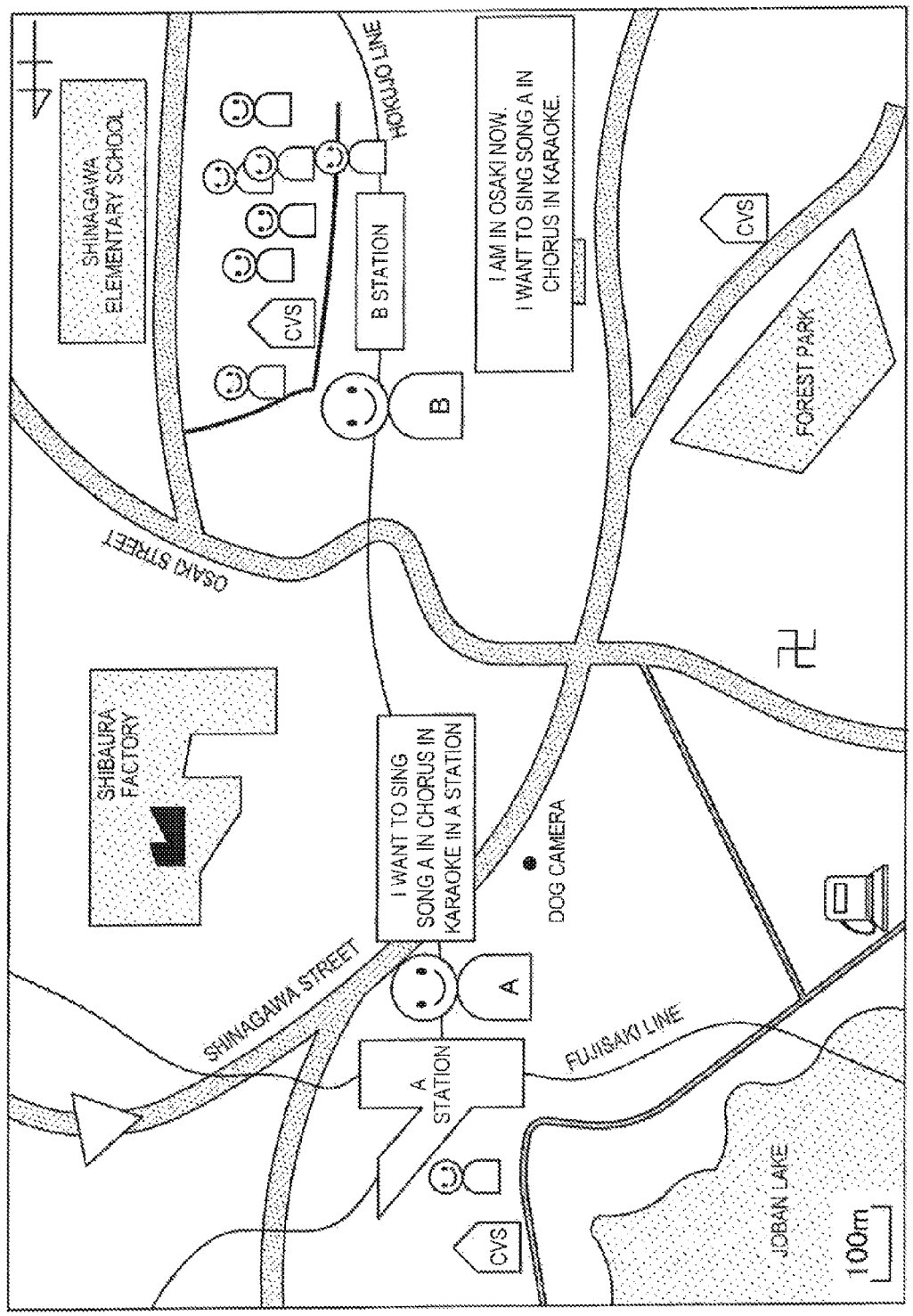
FIG. 10 is an explanatory diagram illustrating a specific example of an experience place map.

However, the experience place of user A is "A station" while the experience place of user B is "B station," and therefore user A and user B are not able to sing song A in chorus if this goes on. Therefore, for example, as illustrated in FIG. 10, the display generating unit 136 generates an experience place map indicating a relationship of the experience places of users A and B. By providing this experience place map to users A and B, users A and B can find other users having the same object in the near distance.

After that, for example, by making contact with each other and agreeing on an experience place, users A and B can share an experience of singing song A. Alternatively, in a case where the experience recommending unit 137 recommends an experience place (e.g. karaoke bar in A station, karaoke bar in B station or karaoke bar in the way point), by visiting the recommended experience place, users A and B can share an experience.

Here, the experience recommending unit 137 may decide the congestion level every time or place, and recommend an experience place using the decision result of the congestion level. For example, in the case of deciding, based on the experience information stored in the experience information database, that there are many users using the karaoke bar in B station at the current time, the experience recommending unit 137 may recommend the karaoke bar in A station as an experience place. With such a configuration, it is possible to adequately support sharing an experience by a user group.

Second Embodiment

In the experience information database, id "3" is associated with experience information of user C who wants to play game B against someone in C station, and id "4" is associated with experience information of user D who wants to play same game B against someone in same C station. Therefore, the user group extracting unit 135 extracts users C and D having the common experience type, as a user group.

However, the experience time of user C is "present" while the experience time of user D is "future," and therefore users C and D are not able to play game B with each other in C station if this goes on. Therefore, the display generating unit 136 generates an experience time map indicating a relationship of the experience time of users C and D. By providing this experience time map to users C and D, users C and D can find other users having the same object.

After that, for example, by making contact with each other and agreeing on experience time, users C and D can share an experience of playing game B with each other in C station. Alternatively, in a case where the experience recommending unit 137 recommends experience time (e.g. on the afternoon of March 17), by getting together at the recommended time, users C and D can share an experience.

Figure 11:
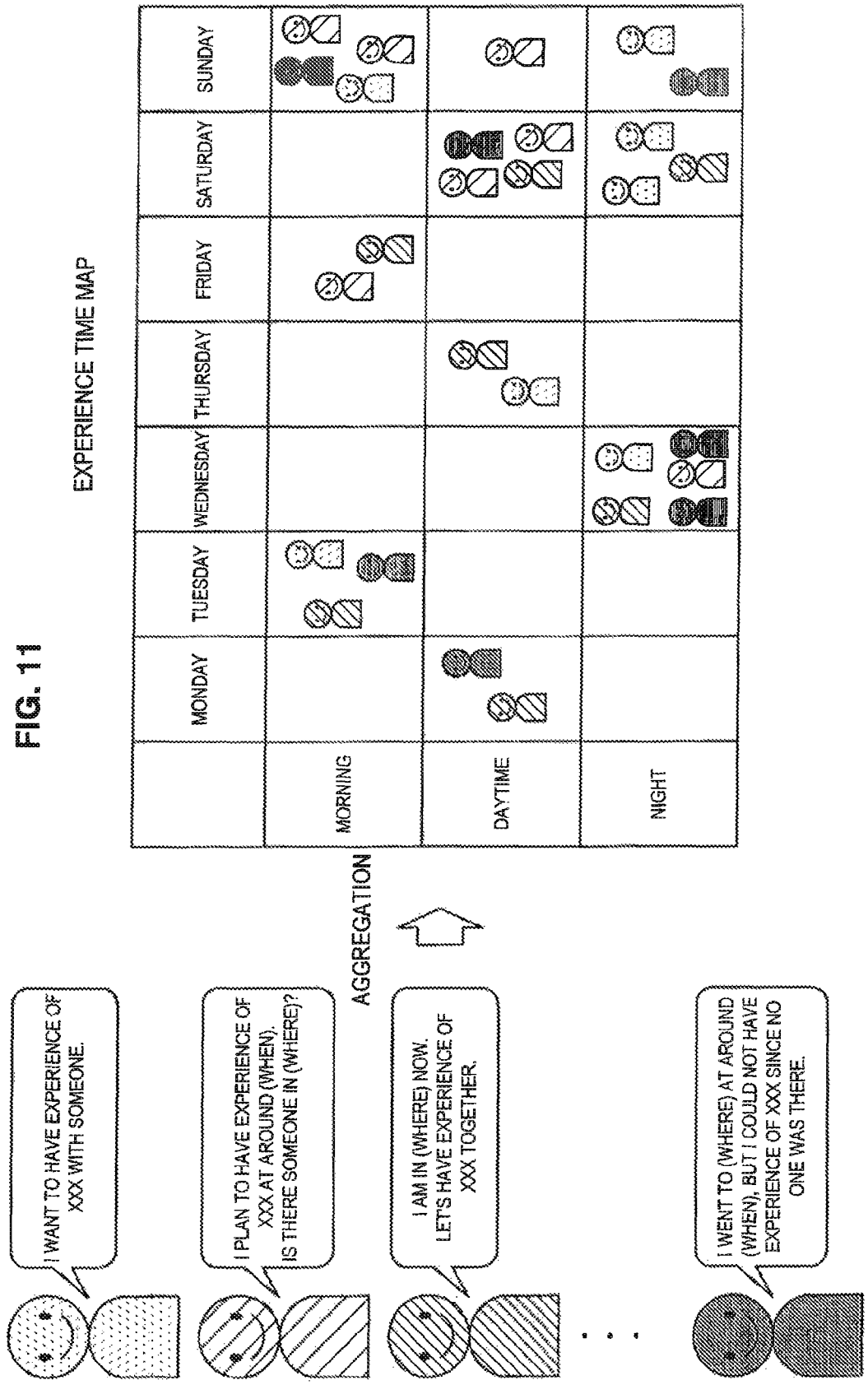
FIG. 11 is an explanatory diagram illustrating a specific example of an experience time map.

Here, with reference to FIG. 11, a configuration example of an experience time map is explained. FIG. 11 is an explanatory diagram illustrating a configuration example of an experience time map generated by the display generating unit 136 for every experience type. As illustrated in FIG. 11, the display generating unit 136 aggregates the experience time of each user on the experience time map in which each experience time is arranged in a matrix manner. With such a configuration, it is possible to visualize a time zone in which the users are likely to get together and a time zone in which the users are not likely to get together, it is possible to provide an opportunity for encounters to a user group who are not able to meet each other without the present system.

Third Embodiment

Although the specific example of experience sharing has been explained above, an example of supporting avoidance of experience sharing is explained as the third embodiment.

In the experience information database, id "5" is associated with experience information of user E who jogs in place D, and id "6" is associated with experience information of user F who jogs in same place D. User E failed to have an experience of comfortable jogging due to congestion. Meanwhile, place D is not congested in a time zone in which user F jogs, and therefore user F succeeded in having an experience of comfortable jogging.

In this case, for example, the display generating unit 136 may generate the experience time map as explained with reference to FIG. 11, with respect to jogging in place D. By referring to the generated experience time map, user E can find a time zone with fewer runners and therefore it is possible to avoid congestion in the next jogging.

Fourth Embodiment

In the experience information database, id "7" is associated with experience information of user G who wants to play jazz music in station A, and id "8" is associated with experience information of user H who wants to listen to jazz music in station A. Here, although the experience types of users G and H are different, there is a relationship of needs and seeds of "playing music" and "listening to music." Therefore, by performing matching based on an experience type pair of seeds and needs created in advance, the user group extracting unit 135 extracts a user group including users G and H.

Figure 12:
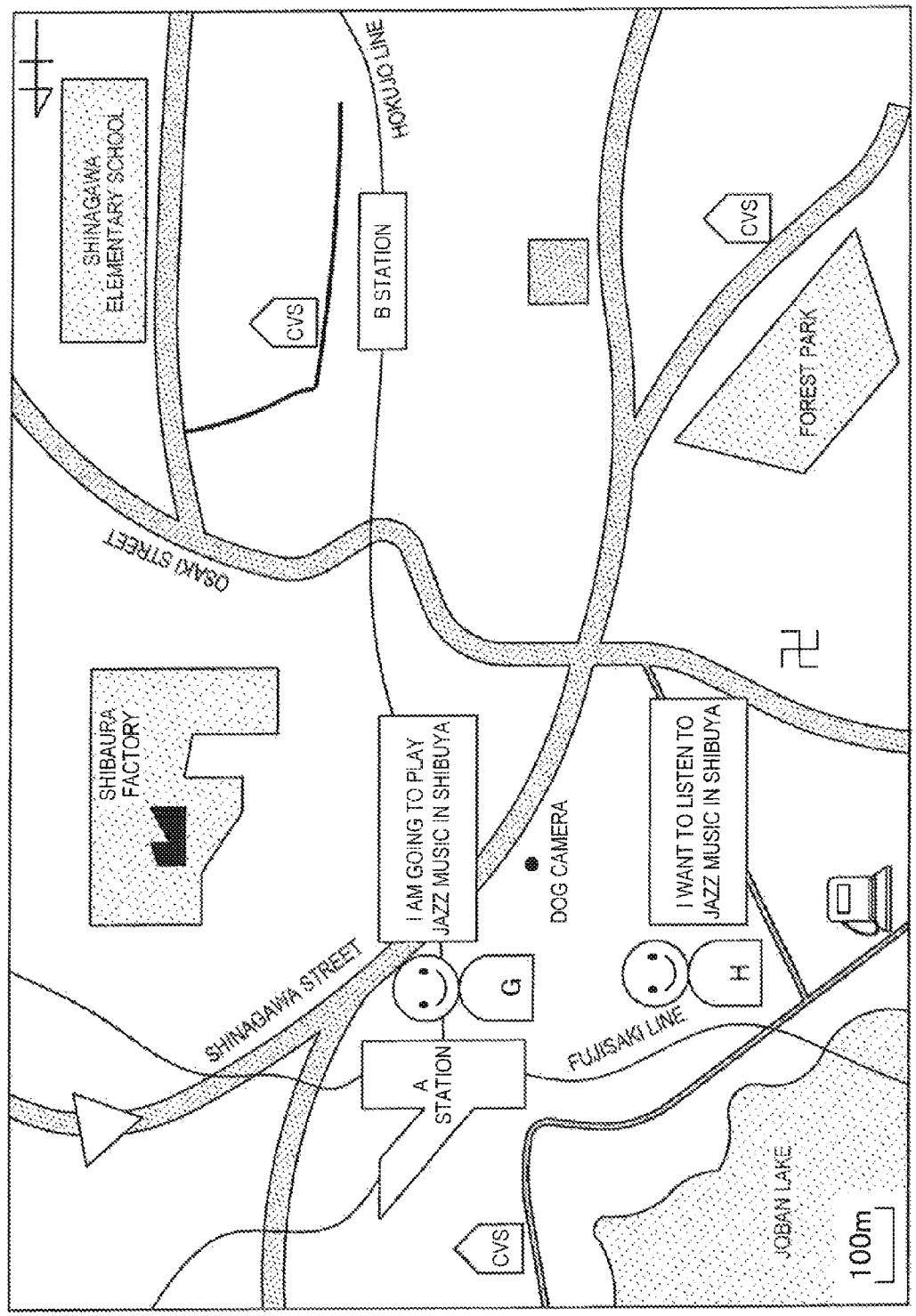
FIG. 12 is an explanatory diagram illustrating a specific example of an experience type map.

Further, the display generating unit 136 may generate the experience type map as illustrated in FIG. 12, for example. With such a configuration, users G and H can find other users in a relationship of seeds and needs, and therefore it is possible to achieve an object of user G and an object of user H.

Also, although a pair of "playing music" and "listening to music" has been described above as an example of seeds and needs, a pair of seeds and needs is not limited to the example. For example, the present embodiment is applicable to various pairs of seeds and needs such as a pair of "buying a thing" and "selling a thing" and a pair of "needing a part-time worker" and "applying for a part-time worker."

Fifth Embodiment

As explained with reference to FIG. 7, the experience extracting unit 132 can extract information related to a non-geographical experience scene such as a "train" and "concert." Therefore, the user extracting unit 135 may extract a user group having a common experience scene as above and the display generating unit 136 may generate a display to visualize the user group extraction result.

Figure 13:
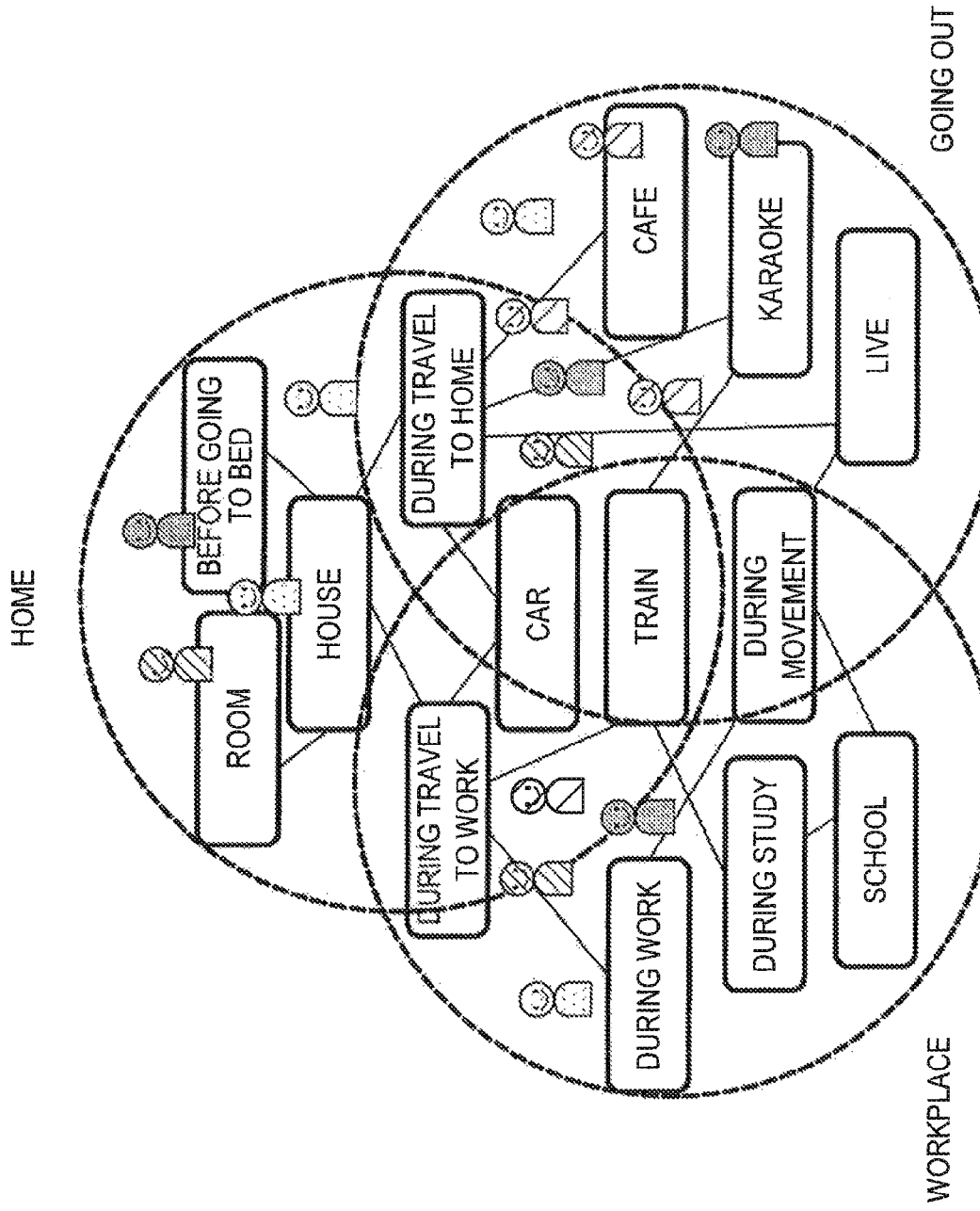
FIG. 13 is an explanatory diagram illustrating a specific example of an experience scene map.

For example, as illustrated in FIG. 13, by arranging user groups corresponding to non-geographical items such as a "home," "workplace" and "going out" and further items indicating the user states such as "during work," "before going to bed" and "during movement," the display generating unit 136 may generate an experience scene map. With such a configuration, since it is possible to realize search/recommendation/matching of users having a similar scene, it is possible to produce a communication effect of high sympathy unique to the users sharing the similar scene.

(Supplement)

Here, there is a case where user's text information is vague and it is difficult to specify a specific experience place or experience time from the text information. For example, regarding text information "I want to have an experience of XXX with someone next time," the experience time is vague and it is difficult to specify specific experience time.

Figure 14:
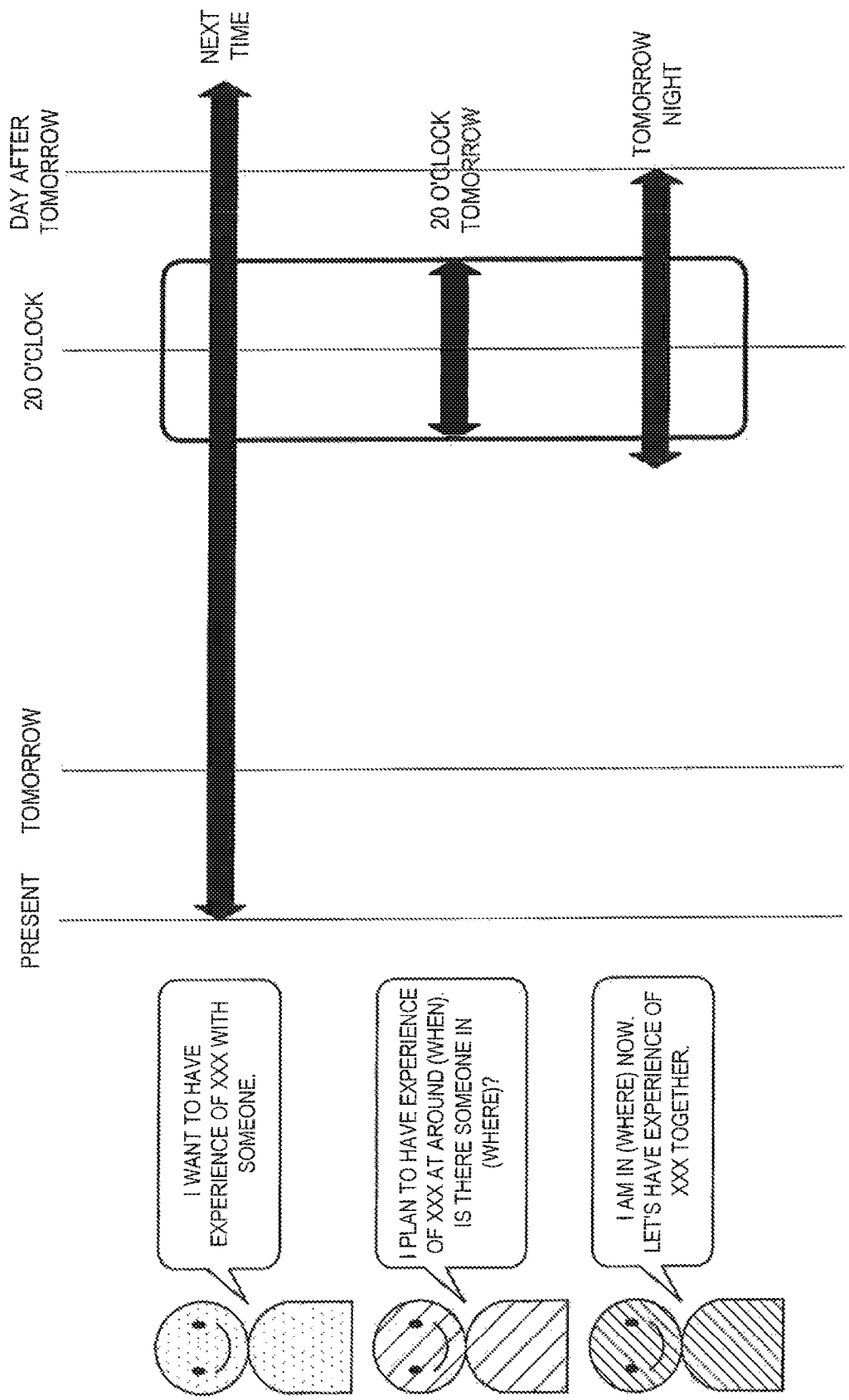
FIG. 14 is an explanatory diagram illustrating a specific example of experience time matching.

Therefore, the user extracting unit 135 may convert experience time extracted from text information into a specific period according to the detail level of time expression and extract a user group that can match the converted period. For example, as illustrated in FIG. 14, the user extracting unit 135 may convert experience time "next time" extracted from text information "I want to have an experience of XXX with someone next time," into a period between the present to the time a predetermined time after the present. Also, the user extracting unit 135 may convert experience time "around 20 o'clock tomorrow" into a period in a predetermined range around 20 o'clock. Similarly, the user extracting unit 135 may convert experience time "tomorrow night" into a period having a corresponding length.

With such a configuration, even in a case where experience time is vague, it is possible to realize adequate matching and report the matching result or recommendation content to a user group.

Figure 15:
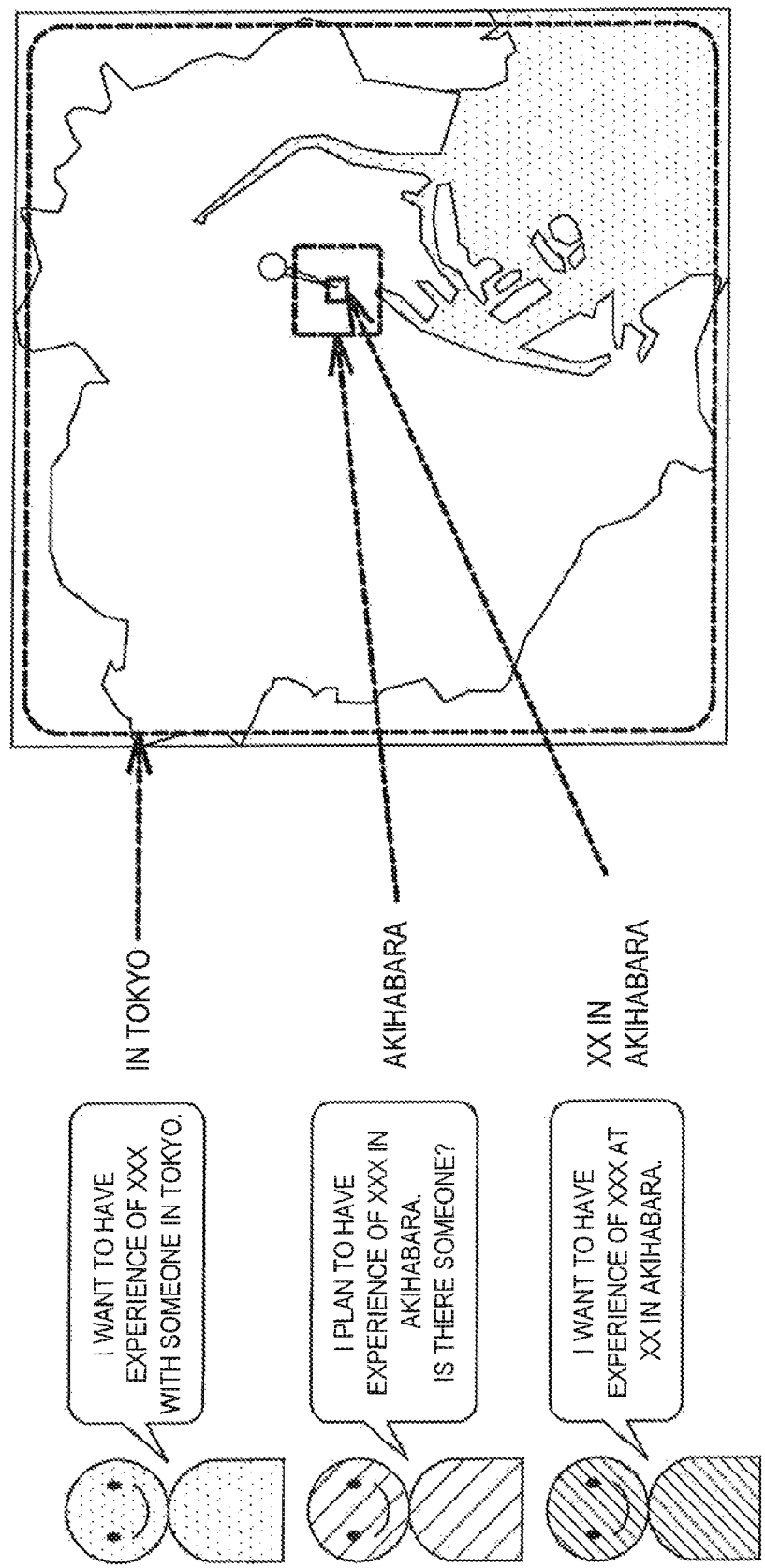
FIG. 15 is an explanatory diagram illustrating a specific example of experience place matching.

Also, the user extracting unit 135 performs similar processing even in a case where an experience place is vague. To be more specific, for example, as illustrated in FIG. 15, the user extracting unit 135 may convert an experience place extracted from text information into a specific range according to the detail level of place expression and extract a user group that can match the converted period.

5. HARDWARE CONFIGURATION

Embodiments of the present disclosure have been explained above. Information processing by the above server apparatus SV is realized by software and cooperation of the server apparatus SV and hardware described below.

Figure 16:
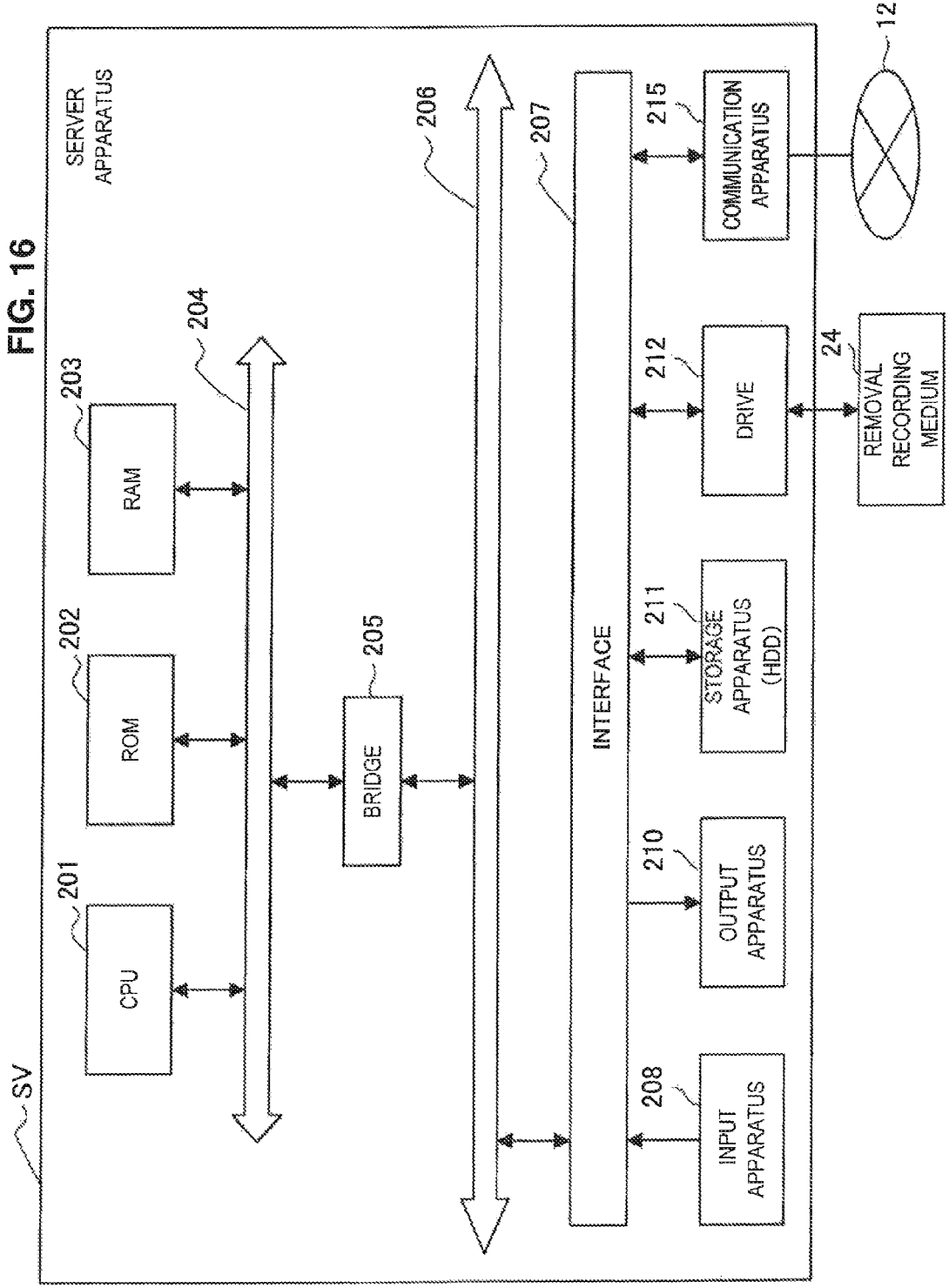
FIG. 16 is an explanatory diagram illustrating a hardware configuration of a server apparatus SV.

FIG. 16 is an explanatory diagram illustrating a hardware configuration of the server apparatus SV. As illustrated in FIG. 16, the server apparatus SV includes a CPU (Central Processing Unit) 201, a ROM (Read Only Memory) 202, a RAM (Random Access Memory) 203, an input apparatus 208, an output apparatus 210, a storage apparatus 211, a drive 212 and a communication apparatus 215.

The CPU 201 functions as an arithmetic processing unit and a control apparatus, and controls the overall operation in the server apparatus SV according to various programs. Also, the CPU 201ν may be a microprocessor. The ROM 202 stores programs or arithmetic parameters used by the CPU 201. The RAM 203 temporarily stores programs used at the time of execution in the CPU 201 and parameters that adequately change depending on the execution. These are mutually connected by a host bus including a CPU bus.

The input apparatus 208 includes an input unit to input information by a user and an input control circuit to generate an input signal based on the input by the user and output it to the CPU 201, where the input unit includes a mouse, a keyboard, a touch panel, a button, a microphone, a switch and a lever. By operating the input apparatus 208, a user of the server apparatus SV can input various kinds of data in the server apparatus SV and designate a processing operation to the server apparatus SV.

The output apparatus 210 includes, for example, a liquid crystal display (LCD) apparatus, an OLED (Organic Light Emitting Diode) apparatus and a display apparatus such as a lamp. Further, the output apparatus 210 includes a sound output apparatus such as a speaker and a headphone. For example, the display apparatus displays a taken image or a generated image. Meanwhile, the sound output apparatus converts sound data or the like into sound and outputs it.

The storage apparatus 211 is a data storage apparatus formed as an example of a storing unit of the server apparatus SV according to the present embodiment. The storage apparatus 211 may include a storage medium, a recording apparatus that records data in the storage medium, a reading apparatus that reads the data from the storage medium and a deleting apparatus that deletes the data recorded in the storage medium. This storage apparatus 211 stores a program executed by the CPU 201 and various kinds of data.

The drive 212 is a storage medium reader/writer and is incorporated in the server apparatus SV or externally attached to the server apparatus SV. The drive 212 reads information recorded in a removable storage medium 24 such as an attached magnetic disk, optical disk, magneto optical disk and semiconductor memory, and outputs it to the RAM 203. Also, the drive 212 can write information in the removable storage medium 24.

The communication apparatus 215 is, for example, a communication interface including a communication device connected to the network 12. Also, the communication apparatus 215 may be a wire communication apparatus that performs communication by wire, even if it is a communication apparatus supporting a wireless LAN (Local Area Network) or a communication apparatus supporting LTE (Long Term Evolution).

Also, the network 12 is a wire or wireless transmission path for information transmitted from an apparatus connected to the network 12. For example, the network 12 may include public line networks such as the Internet, phone line network and satellite communication network, various kinds of LAN's (Local Area Networks) including Ethernet (registered trademark), and a WAN (Wide Area Network). Also, the network 12 may include a dedicated line network such as an IP-VPN (Internet Protocol-Virtual Private Network).

6. CONCLUSION

As described above, by comparing experience information of multiple users extracted from text information, the server apparatus SV according to the present embodiment extracts a user group in which a commonality of the experience information is found. In this way, by providing an opportunity for encounters to a user group who are not able to meet each other without support, it is possible to support sharing an experience by the user group.

It should be understood by those skilled in the art that various modifications, combinations, sub-combinations and alterations may occur depending on design requirements and other factors insofar as they are within the scope of the appended claims or the equivalents thereof.

For example, although an example has been described above where a user group is extracted based on experience information acquired by analyzing text information, the present disclosure is not limited to the example. For example, the server apparatus SV may further include an action extracting unit that extracts user's action pattern information based on sensor information acquired from a sensor set in the information terminal CL, and the user extracting unit 135 may extract a user group by comparing an information group including experience information and action pattern information. As the sensor set in the information terminal CL, there are provided a motion sensor, a position sensor, and so on. For example, the action extracting unit extracts action pattern information that a user is jogging, based on sensor information acquired from a motion sensor, adds position information acquired from a position sensor and can thereby decide where the user is jogging.

Also, the steps in processing in the server apparatus SV according to the specification are not requested to be chronologically processed along the order disclosed in the flowchart. For example, the steps in the processing in the server apparatus SV may be processed in different order from the order disclosed in the flowchart or processed in parallel.

Also, it is possible to create a computer program that can cause hardware such as the CPU 201, the ROM 202 and the RAM 203 incorporated in the server apparatus SV to fulfill a function equivalent to that of each configuration of the above server apparatus SV. Also, a storage medium caused to store the computer program is provided.

Additionally, the present technology may also be configured as below.

(1) An information processing apparatus including:
an experience extracting unit extracting experience information including information related to a time or a place from text information input by a user; and
a user extracting unit extracting a user group in which the experience information of one or more users extracted by the experience extracting unit is compared to find a commonality in the experience information.

(2) The information processing apparatus according to (1), further including:
a display generating unit generating a display indicating a relationship of the experience information of the user group extracted by the user extracting unit.

(3) The information processing apparatus according to (1) or (2), further including:
an experience recommending unit recommending a time or a place for experience sharing to the user group extracted by the user extracting unit.

(4) The information processing apparatus according to (3), wherein the experience recommending unit decides a congestion level at a certain time or in a certain place based on the experience information of the one or more users, and recommends the time or the place for experience sharing using a decision result of the congestion level.

(5) The information processing apparatus according to (1) or (2), further including:
an experience recommending unit recommending a time or a place for avoiding experience sharing with another user to at least a part of the one or more users included in the user group extracted by the user extracting unit.

(6) The information processing apparatus according to any one of (1) to (5), further including:
an action extracting unit extracting action information of a user from sensor information,
wherein the user extracting unit compares the user group including the experience information of the one or more users extracted by the experience extracting unit and the action pattern information of the one or more users extracted by the action extracting unit.

(7) The information processing apparatus according to any one of (1) to (6),
wherein the experience information further includes information related to an experience type; and wherein the user extracting unit refers to information related to the experience type, and, in a case where a commonality is found between a target provided as an experience of a first user and a target requested to be provided as an experience of a second user, extracts a user group including the first user and the second user.

(8) The information processing apparatus according to any one of (1) to (7),
wherein the experience information further includes information related to a non-geographical experience scene; and
wherein the user extracting unit refers to the information related to the non-geographical experience scene and extracts a user group in which a commonality in the non-graphical experience scene is found.

(9) An information processing method including:
extracting experience information including information related to a time or a place from text information input by a user, and
extracting a user group in which the experience information of one or more users is compared to find a commonality in the experience information.

(10) A program for causing a computer to function as an information processing apparatus, the information processing apparatus including
an experience extracting unit extracting experience information including information related to a time or a place from text information input by a user; and
a user extracting unit extracting a user group in which the experience information of one or more users extracted by the experience extracting unit is compared to find a commonality in the experience information.

What is claimed is:

1. A server comprising:
circuitry configured to
retrieve first experience information of a person, the first experience information indicating a future experience of the person and including information related to non-geographical experience scene,
retrieve second experience information of other people, the second experience information indicating future experiences of other people and including information related to non-geographical experience scene, and
extract, from among the other people, those people who have a commonality with the person based on the information including the non-geographical experience scene of the first experience information and the information including the non-geographical experience scene of the second experience information.

2. The server according to claim 1, wherein the non-geographical experience scene corresponds to a train.

3. The server according to claim 1, wherein the non-geographical experience scene corresponds to a concert.

4. The server according to claim 1, wherein the circuitry is further configured to
generate a display indicating a relationship of the second experience information of the extracted people.

5. The server according to claim 1, wherein the circuitry is further configured to
recommend a time or a place for experience sharing to the extracted people.

6. The server according to claim 5, wherein the circuitry is further configured to
decide a congestion level at a certain time or in a certain place based on the second experience information of the extracted people, and
recommend the time or the place for experience sharing using a decision result of the congestion level.

7. The server according to claim 1, wherein the circuitry is further configured to
recommend a time or a place for avoiding experience sharing with another person to at least a part of the other people included in the extracted people.

8. The server according to claim 1, wherein the circuitry is further configured to
retrieve action information of people from sensor information; and
compare the extracted people including the retrieved second experience information and the retrieved action information.

9. The server according to claim 1,
wherein the first experience information and the second experience information each includes information related to experience type; and
wherein the extracted people are extracted from among the other people based on the information related to the experience type, and, in a case where a commonality is found between a target provided as an experience of a first person and a target requested to be provided as an experience of a second person, the first person and the second person are extracted as people who have the commonality.

10. The server according to claim 1, wherein the extracted people comprises those people of the other people who have second experience information that matches the retrieved first experience information.

11. The server according to claim 1, wherein the first experience information indicates the future experience of the person as a current desire of the person.

12. The server according to claim 11, wherein the second experience information indicates the future experiences of the other people as current desires of the other people.

13. The server according to claim 1, wherein the second experience information indicates the future experiences of the other people as current desires of the other people.

14. An information processing method comprising:
retrieving first experience information of a person, the first experience information indicating a future experience of the person and including information related to non-geographical experience scene;
retrieving second experience information of other people, the second experience information indicating future experiences of other people and including information related to non-geographical experience scene; and
extracting, from among the other people, those people who have a commonality with the person based on the information including the non-geographical experience scene of the first experience information and the information including the non-geographical experience scene of the second experience information.

15. A non-transitory computer-readable medium having embodied thereon a program, which when executed by a computer causes the computer to execute a method, the method comprising:
retrieving first experience information of a person, the first experience information indicating a future experience of the person and including information related to non-geographical experience scene;
retrieving second experience information of other people, the second experience information indicating future experiences of other people and including information related to non-geographical experience scene; and extracting, from among the other people, those people who have a commonality with the person based on the information including the non-geographical experience scene of the first experience information and the information including the non-geographical experience scene of the second experience information.

16. The information processing method according to claim 14, wherein the non-geographical experience scene corresponds to a train.

17. The information processing method according to claim 14, wherein the non-geographical experience scene corresponds to a concert.

18. The information processing method according to claim 14, further comprising:
generating a display indicating a relationship of the second experience information of the extracted people.

19. The information processing method according to claim 14, further comprising:
recommending a time or a place for experience sharing to the extracted people.

20. The information processing method according to claim 19, further comprising:
deciding a congestion level at a certain time or in a certain place based on the second experience information of the extracted people; and
recommending the time or the place for experience sharing using a decision result of the congestion level.

21. The information processing method according to claim 14, further comprising:
recommending a time or a place for avoiding experience sharing with another person to at least a part of the other people included in the extracted people.

22. The information processing method according to claim 14, further comprising:
retrieving action information of people from sensor information; and
comparing the extracted people including the retrieved second experience information and the retrieved action information.

23. The information processing method according to claim 14,
wherein the first experience information and the second experience information each includes information related to experience type, and
wherein the extracted people are extracted from among the other people based on the information related to the experience type, and, in a case where a commonality is found between a target provided as an experience of a first person and a target requested to be provided as an experience of a second person, the first person and the second person are extracted as people who have the commonality.

24. The information processing method according to claim 14, wherein the extracted people comprises those people of the other people who have second experience information that matches the retrieved first experience information.

25. The information processing method according to claim 14, wherein the first experience information indicates the future experience of the person as a current desire of the person.

26. The information processing method according to claim 25, wherein the second experience information indicates the future experiences of the other people as current desires of the other people.

27. The information processing method according to claim 14, wherein the second experience information indicates the future experiences of the other people as current desires of the other people.

28. The non-transitory computer-readable medium according to claim 15, wherein the non-geographical experience scene corresponds to a train.

29. The non-transitory computer-readable medium according to claim 15, wherein the non-geographical experience scene corresponds to a concert.

30. The non-transitory computer-readable medium according to claim 15, wherein the executed method further comprises:
generating a display indicating a relationship of the second experience information of the extracted people.

31. The non-transitory computer-readable medium according to claim 15, wherein the executed method further comprises:
recommending a time or a place for experience sharing to the extracted people.

32. The non-transitory computer-readable medium according to claim 31, wherein the executed method further comprises:
deciding a congestion level at a certain time or in a certain place based on the second experience information of the extracted people; and
recommending the time or the place for experience sharing using a decision result of the congestion level.

33. The non-transitory computer-readable medium according to claim 15, wherein the executed method further comprises:
recommending a time or a place for avoiding experience sharing with another person to at least a part of the other people included in the extracted people.

34. The non-transitory computer-readable medium according to claim 15, wherein the executed method further comprises:
retrieving action information of people from sensor information; and
comparing the extracted people including the retrieved second experience information and the retrieved action information.

35. The non-transitory computer-readable medium according to claim 15,
wherein the first experience information and the second experience information each includes information related to experience type, and
wherein the extracted people are extracted from among the other people based on the information related to the experience type, and, in a case where a commonality is found between a target provided as an experience of a first person and a target requested to be provided as an experience of a second person, the first person and the second person are extracted as people who have the commonality.

36. The non-transitory computer-readable medium according to claim 15, wherein the extracted people comprises those people of the other people who have second experience information that matches the retrieved first experience information.

37. The non-transitory computer-readable medium according to claim 15, wherein the first experience information indicates the future experience of the person as a current desire of the person.

38. The non-transitory computer-readable medium according to claim 37, wherein the second experience information indicates the future experiences of the other people as current desires of the other people.

39. The non-transitory computer-readable medium according to claim 15, wherein the second experience information indicates the future experiences of the other people as current desires of the other people.

\* \* \* \* \*